United States Patent
Basak et al.

(10) Patent No.: US 7,529,693 B2
(45) Date of Patent: May 5, 2009

(54) METHOD AND SYSTEM FOR DESIGNING A CATALOG WITH OPTIMIZED PRODUCT PLACEMENT

(75) Inventors: Jayanta Basak, New Delhi (IN); Rajendra Sureka, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1356 days.

(21) Appl. No.: 10/632,013

(22) Filed: Jul. 31, 2003

(65) Prior Publication Data
US 2005/0027619 A1  Feb. 3, 2005

(51) Int. Cl.
*G06F 17/30* (2006.01)

(52) U.S. Cl. ............... 705/27; 705/1; 705/26

(58) Field of Classification Search ............ None
See application file for complete search history.

(56) References Cited

U.S. PATENT DOCUMENTS

| | | | |
|---|---|---|---|
| 6,064,980 A * | 5/2000 | Jacobi et al. ............. 705/26 |
| 6,266,649 B1 | 7/2001 | Linden et al. | |
| 6,286,005 B1 * | 9/2001 | Cannon ................. 707/100 |
| 6,907,566 B1 * | 6/2005 | McElfresh et al. ....... 715/210 |
| 6,963,850 B1 * | 11/2005 | Bezos et al. ............. 705/26 |
| 6,978,273 B1 * | 12/2005 | Bonneau et al. ......... 707/102 |
| 6,985,897 B1 * | 1/2006 | Abrahams ................ 707/4 |
| 7,228,283 B1 * | 6/2007 | Hornstein ............... 705/10 |
| 7,249,067 B2 * | 7/2007 | Doerksen et al. ........ 705/27 |
| 7,254,552 B2 * | 8/2007 | Bezos et al. ............. 705/26 |
| 2002/0019763 A1 * | 2/2002 | Linden et al. ............ 705/10 |
| 2002/0082953 A1 * | 6/2002 | Batham et al. ........... 705/27 |
| 2002/0143603 A1 * | 10/2002 | Moore ................... 705/10 |
| 2002/0161664 A1 | 10/2002 | Shaya et al. | |
| 2003/0009448 A1 * | 1/2003 | Covington et al. ......... 707/3 |
| 2003/0055729 A1 * | 3/2003 | Bezos et al. ............. 705/14 |
| 2003/0216930 A1 * | 11/2003 | Dunham et la. ........... 705/1 |

OTHER PUBLICATIONS

Yoon Ho Cho, Jae Kyeong Kim and Soung Hie Kim, "A personalized recommender system based on web usage mining and decision tree induction" Source: Internet weblink—http://monkey.icu.ac.kr.sslab/course/ICE720/data/subjectPresentation/A PersonalizedRecommenderSystem.pdf.

Internet weblink—http://www.Catalog.com.

News article: Lisa Biank Fasig "The catalog store—Catalog shop must operate by the book—and calendar" Source: Internet weblink—http://www.enquirer.com/today/business.html.

* cited by examiner

*Primary Examiner*—F. Zeender
*Assistant Examiner*—Asfand M Sheikh
(74) *Attorney, Agent, or Firm*—Gibb I.P. Law Firm, LLC (57) ABSTRACT

The current invention provides a method, system and computer program product for designing a catalog with optimized placement of items. Past user transactions are used to estimate the effect of nature and placement of an item on the response of users to the catalogs in terms of items clicked on or items purchased. These estimations are used to optimize the placement of items in a catalog in order to maximize the gains for a merchant specified objective, which can be in terms of revenues, sales or the number of clicks. Various stochastic and deterministic optimization functions are used for the purpose of optimization.

3 Claims, 6 Drawing Sheets

METHOD AND SYSTEM FOR DESIGNING A CATALOG WITH OPTIMIZED PRODUCT PLACEMENT

FIELD OF THE INVENTION

The present invention relates to the field of electronic catalog design. More specifically, the invention relates to a method, system and computer program product for designing a catalog based on the past user transactions.

BACKGROUND

Popularity of the Internet and refinement of issues like Internet security has encouraged selling and purchasing of items over the Internet. Several online stores exist which facilitate buying and selling of items such as books, clothes, shoes, music cassettes, videos and other consumer goods. When customers visit an online store, they are presented with a list of items available in the store, as per the requirement of the user. The list of items grouped together in a systematic manner for presentation to the customer is also known as a catalog.

Design of catalog is an important issue because the placement of products influences the sales of the products. Customer's response in terms of purchase of a product changes if the catalog changes. For example, if two similar products are placed very near to each other in a catalog then the sales of one can increase or decrease the sales of the other. Similarly, a product placed on the top of the catalog is expected to get a better response as compared to a similar product at the bottom. Also, presenting items to a customer that the customer does not have interest in, can prove to be an improper sales strategy. Therefore, designing a catalog is an important issue when it comes to following a proper sales strategy.

Catalog design is inherently related to product recommendation where product attributes and customer attributes are considered. Several techniques exist that facilitate recommendation of products to users. Some of these will be discussed hereinafter.

United States patent application number 20020019763A1 titled "Use of Product Viewing Histories of Users to Identify Related Products" deals with item presentation on websites. This patent discloses various methods for monitoring user-browsing activities that indicate user interests in particular products. This information is used to identify relationship among products and to develop a table for mapping products to sets of related products. This table is then used for product recommendations.

U.S. Pat. No. 6,266,649, titled "Collaborative Recommendations using Item-Item Similarity Mappings" is assigned to Amazon.com, Inc. This patent discloses a recommendation service that recommends products to users based on a set of products known to be of interest to the user. The recommendations are based on collective interests of a group of users.

United States patent application number 20020161664A1 titled "Intelligent Performance-Based Product Recommendation System", also deals with item presentation on websites. This patent discloses a system and method for recommending products from a predefined population of commercially available products based on user demand and product responsiveness patterns.

A publication titled "A personalized recommender system based on web usage mining and decision tree induction", by Yoon Ho Cho, Jae Kyeong Kim and Soung Hie Kim (http://monkey.icu.ac.kr/sslab/course/ICE720/data/subjectPresentation/APersonalizedRecommenderSystem.pdf), describes a method for personalized recommendation to users with a list of products obtained by applying data mining techniques to discover user behavior patterns based on web data.

Internet website, http://www.Catalog.com, offers manual placement of products in catalogs offered on the web. Catalog.com has a Directory Community that allows customers to go through each of their communities and sub-communities to find the most specific and proper placement for their products.

Lastly, a news article titled "The catalog store—Catalog shop must operate by the book—and calendar", by Lisa Biank Fasig (http://www.enquirer.com/today/business.html), describes catalogs by Frontgate that are generated after examining yearlong purchase trends and patterns. These trends are used to place products in a catalog so as to influence the number of products being ordered. These catalogs use past user transactions to decide current placement of items in the catalog.

Although the products, patents and publications discussed above propose techniques for design of catalogs, they suffer from one or more of the following drawbacks. None of the above-mentioned art provides an end-to-end, dynamic and automatic method for adapting catalogs to changing user demands. Also, these techniques do not provide for optimizing the relative placement of products in a catalog for maximizing the revenue or sales or number of clicks.

Therefore, in light of the existing art, there is need for a method and system for designing a catalog based on responses of users. Also, there is need for a method and system for automatically designing a catalog with optimized placement of products in order to maximize the revenue or sales or number of clicks.

SUMMARY

An object of the present invention is to provide a method, system and computer program product for designing a catalog for a list of items with optimized placement of items on the catalog in order to maximize the interest of the merchant, which can be in terms of revenues, sales or number of clicks.

Another object of the current invention is to use the relation between the position of an item in a catalog and the corresponding effect on user response to dynamically update the position of products in a catalog.

The current invention provides a method, system and computer program product for generation of catalogs based on past user transactions. The past user transactions are used to estimate the effect of nature and placement of an item on the response of users to the catalogs in terms of items clicked on or items purchased. These estimations are used to optimize the placement of items in a catalog in order to maximize the gains for a merchant specified objective, which can be in terms of revenues, sales or the number of clicks.

In an embodiment of the current invention, a set of initial catalogs, each with different product placements, are deployed. User response data is collected for the deployed catalogs. This data is used to estimate search cost parameters and product differentials for the products. These catalog parameters determine the relationship between user responses, nature of the product and product placement in the catalog. Thereafter, the merchant specified objective is modeled as an optimization function in terms of item placement, item differentials and search costs.

Subsequently, this optimization function is evaluated to obtain the most optimal placement of products in the catalog in order to maximize the interests of the merchant in terms of revenues, sales or number of clicks.

BRIEF DESCRIPTION OF THE DRAWINGS

The preferred embodiments of the invention will hereinafter be described in conjunction with the appended drawings, provided to illustrate and not to limit the invention and in which like designations denote like elements.

DESCRIPTION OF PREFERRED EMBODIMENTS

The present invention describes a method, system and computer program product for designing an optimal catalog based on user transaction history, with optimized placement of items. Relationship between the relative position of an item in a catalog and the corresponding user response is obtained. This information, along with other product specific information, is utilized to obtain an optimal order of product placement for maximizing the expected gain in terms of revenues or sales or number of clicks.

Figure 1:
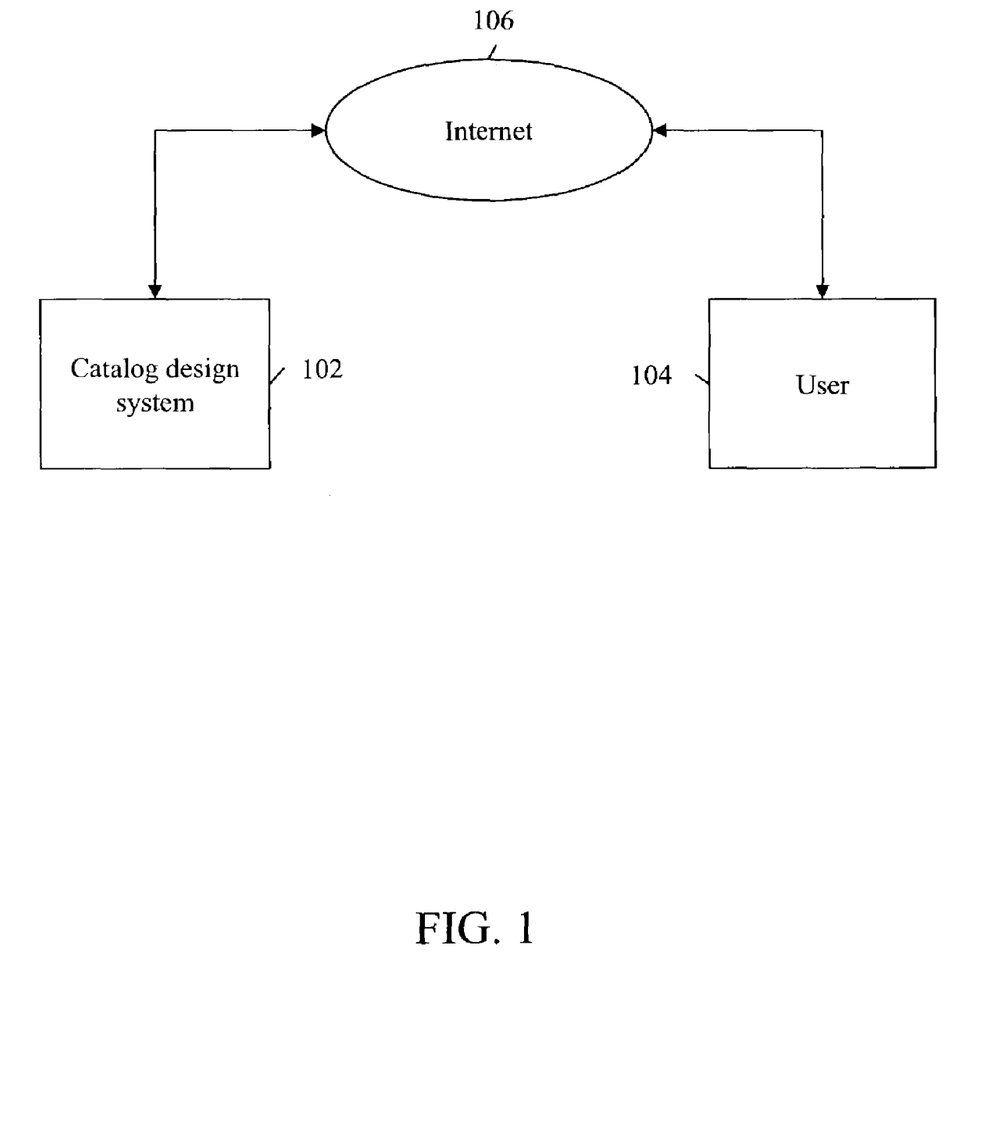
FIG. 1 is a block diagram illustrating the environment in which the present invention operates.

FIG. 1 shows a block diagram illustrating the environment in which the present invention operates. A catalog design system 102 deploys a number of catalogs that can be accessed by a user 104 through the Internet 106. The catalog can be a list of books, electronics or other consumer goods. Examples of catalogs can be seen on Internet web sites such as http://www.amazon.com and http://www.google.com. Though a number of catalogs are deployed, a group of users can view only one catalog over a given period of time. Thus a number of catalogs being referred to are the different catalogs for the different user groups over the same period of time. Also a number of different catalogs are presented to the same group of users at different periods of time. Catalog design system 102 records user activities for the deployed catalogs. User responses are recorded in terms of purchase (such as number of items bought, amount spent) and the number of clicks. The responses can be stored in a separate database table. The required responses can also be derived from the transaction or purchase history, which is usually made available. Using user activity information, catalog design system 102 generates a catalog with optimized placements of items. The optimization of products is done in order to maximize a specified objective. The objective is particular traits desired by the merchant from the catalog. For example, the objective can relate to increasing the revenues a merchant expects from the set of products displayed in the catalog. It may also relate to maximizing the sales of a new product. It may also relate to maximizing the number of clicks a particular product, listed in the catalog, receives.

Figure 2:
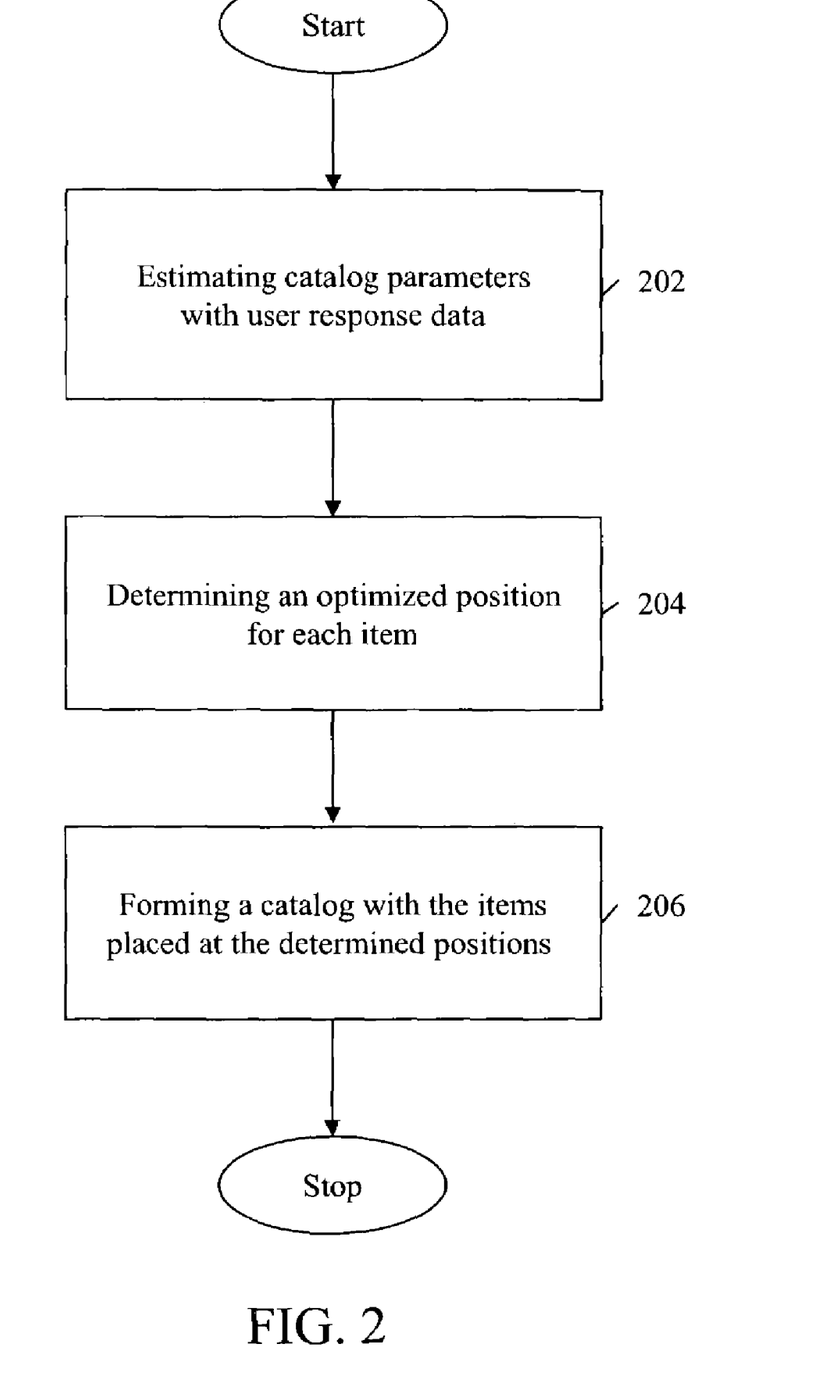
FIG. 2 is a flowchart describing the method for designing a catalog for a list of items in accordance with a preferred embodiment of the present invention.

FIG. 2 is a flowchart describing the method for designing a catalog for a list of items. At step 202, the relationship between placement of an item in a catalog and the corresponding user responses is established. The relationships are established in terms of catalog parameters. Details on the catalog parameters as well as the exact manner in which they are estimated will be explained in conjunction with FIG. 3. User response can be obtained from transaction history available with the merchant. User responses are measured in terms of purchases or clicks taking place at the catalog. Usually, on-line stores have mechanisms for storing the purchase or transaction data. The user responses for various products can be derived directly from the transaction data. The relationship can be estimated by recording the user responses based on the nature of the item. The relationship can also be estimated by recording the effect of the placement of an item on the user responses.

Once the relationship has been established, optimization of item placements in a catalog is carried out at step 204. In this step, an optimal position for each item in the catalog is determined. This is done using the relationships determined at step 202. The exact manner in which optimization is done will be explained in detail later. Thereafter, at step 206, a catalog is formed using the optimized positions identified at step 204. Optimization of item placements in a catalog is done to achieve greater user response towards items in the catalog. The optimization of catalogs results in an arrangement of items such that maximum user responses are generated. For example, consider the case of a catalog of books available on an Internet web site. If two books related to the same topic are placed next to each other, then users would tend to buy just one of the two books and not both. Hence both the books affect each other's purchases. Optimization would ensure that with the two books placed at their optimized positions, together would generate maximum revenues.

Figure 3:
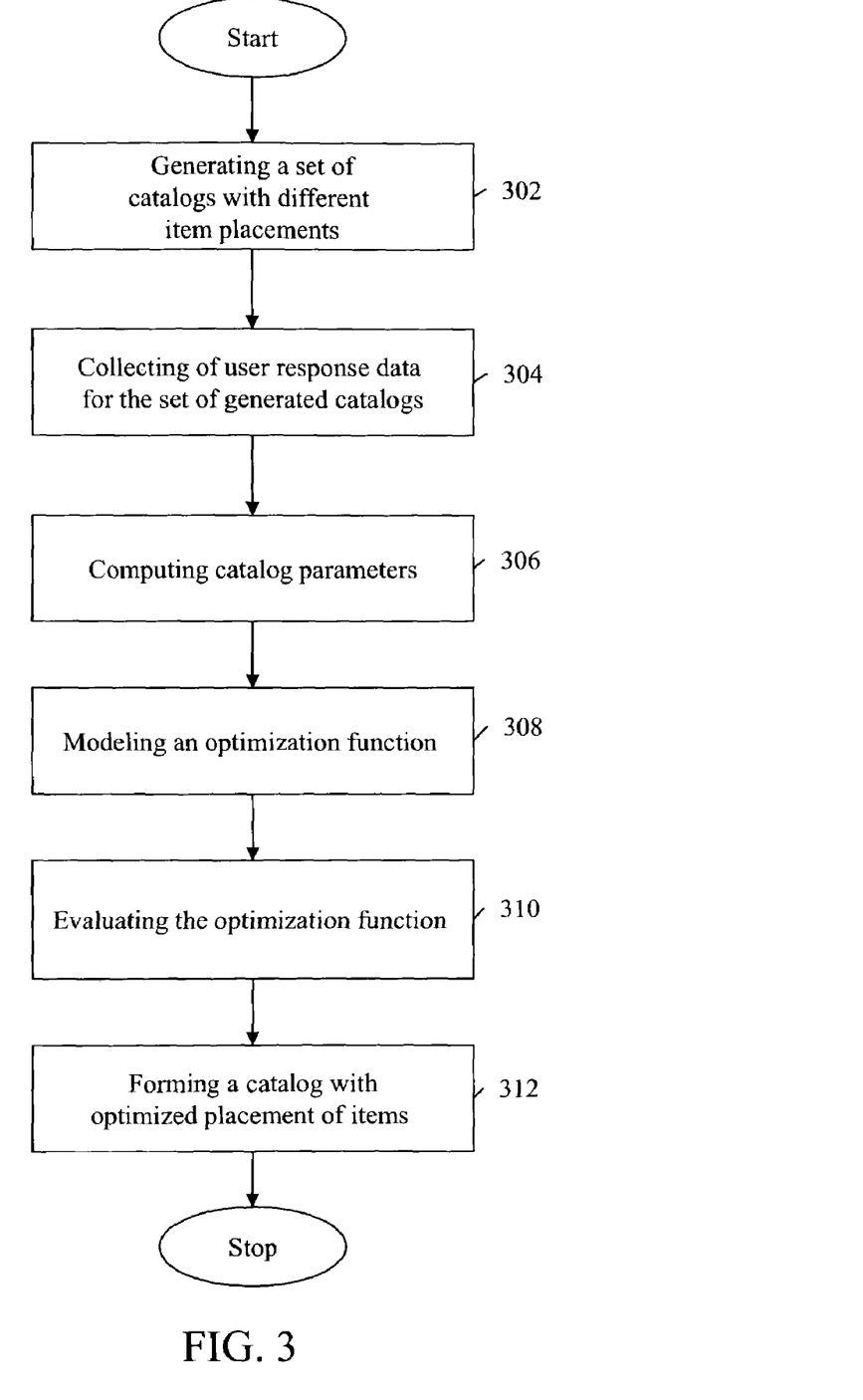
FIG. 3 shows a flowchart illustrating, in detail, the working of a preferred embodiment of the present invention.

FIG. 3 shows a flowchart illustrating, in detail, the working of a preferred embodiment of the present invention. At step 302, a set of initial catalogs is generated. Generation of catalogs can be done in many ways. The merchant, for whom the catalog is being generated, can provide the initial set of catalogs with each initial catalog having different item placements. Data mining techniques employed on previous purchase patterns can also be used to generate the initial catalogs. Using data mining techniques, association rules can be derived from the transaction table to find out which products are highly associated with each other. If more than one product is highly associated with other, i.e., often bought together (such as bread and milk) then they can be placed close to each other or away from each other in the initial catalog design depending on the merchant's intent.

Initial placement of products in a catalog can be guided by the statistical findings such as correlation between the purchase patterns of different products. Certain statistical tests such as $\chi^2$-test (chi-square) test can be used for this purpose. Details on the $\chi^2$-test as well as the data mining techniques, mentioned above, can be obtained from reference: S.Brin, R. Motwani, and C. Silverstein. "Beyond Market baskets: Generalizing association rules to correlations", Data Mining and Knowledge Discovery 2, No. 1, 39-68 (1998) - - - -. If it is observed that the purchase patterns of more than one product is highly correlated with each other then they can be placed together or away from each other in the initial catalog depending on the merchant's intent.

One can also randomly generate a set of initial catalogs with varied item placements. A set of optimized catalogs generated by using the method disclosed in the present invention can also be used as a set of initial catalogs. This would cause iterative refinement of the optimal catalogs. Although certain methods of generation of initial catalogs have been mentioned, it must be apparent to one skilled in the art that these are for illustrative purposes only and any other technique for generation of initial catalogs can be used without deviating from the scope of the invention.

The catalogs thus generated include all items that have to be included in the final catalog.

Each catalog in the set has different placement of items. The placements are kept different in order understand changes in user responses with changed positions of items.

At step 304, collection of user response data from a set of initially generated catalogs is carried out. For this, the set of initial catalogs are deployed for user access. The deployment can be over the merchant's e-commerce website which can be accessed by customers of the merchant. After deployment, user responses towards items displayed in each of the initial catalogs is recorded for the purpose of optimization. Thereafter, for every initial catalog, the user responses are recorded corresponding to each item in the catalog.

At step 306, catalog parameters are computed. The catalog parameters quantify the effect of nature of items on user responses towards the items in the catalog. One of the catalog parameters is item differential. Item differential quantifies user responses based on the nature of the item. For example, consider the case of a catalog of varied kinds of books. In this case, nature of the book can relate to the publisher of the book, price of book, writer of book, and the like. Nature of the book can also relate to the field of the book. For example, the book can be a science fiction, comic book, history, autobiography and the like. If user response data indicates that the number of clicks for history books is very low, then the item differential will quantify this information, thereby differentiating a history book from another type of a book.

Another item differential quantifies the effect of nature of an item on user responses towards other items displayed in the catalog. Considering a history book and a book on jokes present in the same catalog. It is possible that the general populace prefers buying a book on jokes rather than history. Therefore, with the presence of a book on jokes, the sales of a book on history will reduce.

Another class of catalog parameter is called the search cost parameters. Search cost parameter quantify the effect of placement of items on user responses. One of the parameters in this category quantifies the effect of placement of an item in a catalog on user response. In case an item is placed at the top of a catalog, then it receives more user responses as compared to when it is placed at the bottom. This is so because an item placed at the top is immediately noticed by a user browsing through a catalog compared to an item placed at the bottom or middle of the catalog.

Another search cost parameter estimates effect of placement of some items on user responses towards a specific item placed in the catalog. The relative distance between the items can also account for changes in user response. Consider a case where two science fiction books written by different authors are placed together. If author of one book is more well known than that of the other, people would have a greater tendency to opt for the book by the famous author. The search cost in this case would quantify lower user response towards a book by the less famous author when the two books are placed close to each other.

Various methods can be used for estimation of catalog parameters. Some of the methods are maximum likelihood estimate, non-linear regression, machine learning, heuristic search, randomized search, tabu search, genetic algorithms and data mining algorithms (example association rule mining). All these methods exist in the art.

An optimization function is modeled at step 308. The modeling is done using the catalog parameters and the position of the items in the catalog. The exact manner in which the function is modeled will be explained in detail later.

At step 310, the optimization function is evaluated. Evaluation of the modeled expression involves the optimization of the functions using various methods such as linear quadratic programming, neural networks, simulated annealing, mean field annealing, genetic algorithms and randomized search algorithms.

Thereafter, at step 312, a catalog is formed with the placement of items being at the optimal positions determined at step 310.

Figure 4:
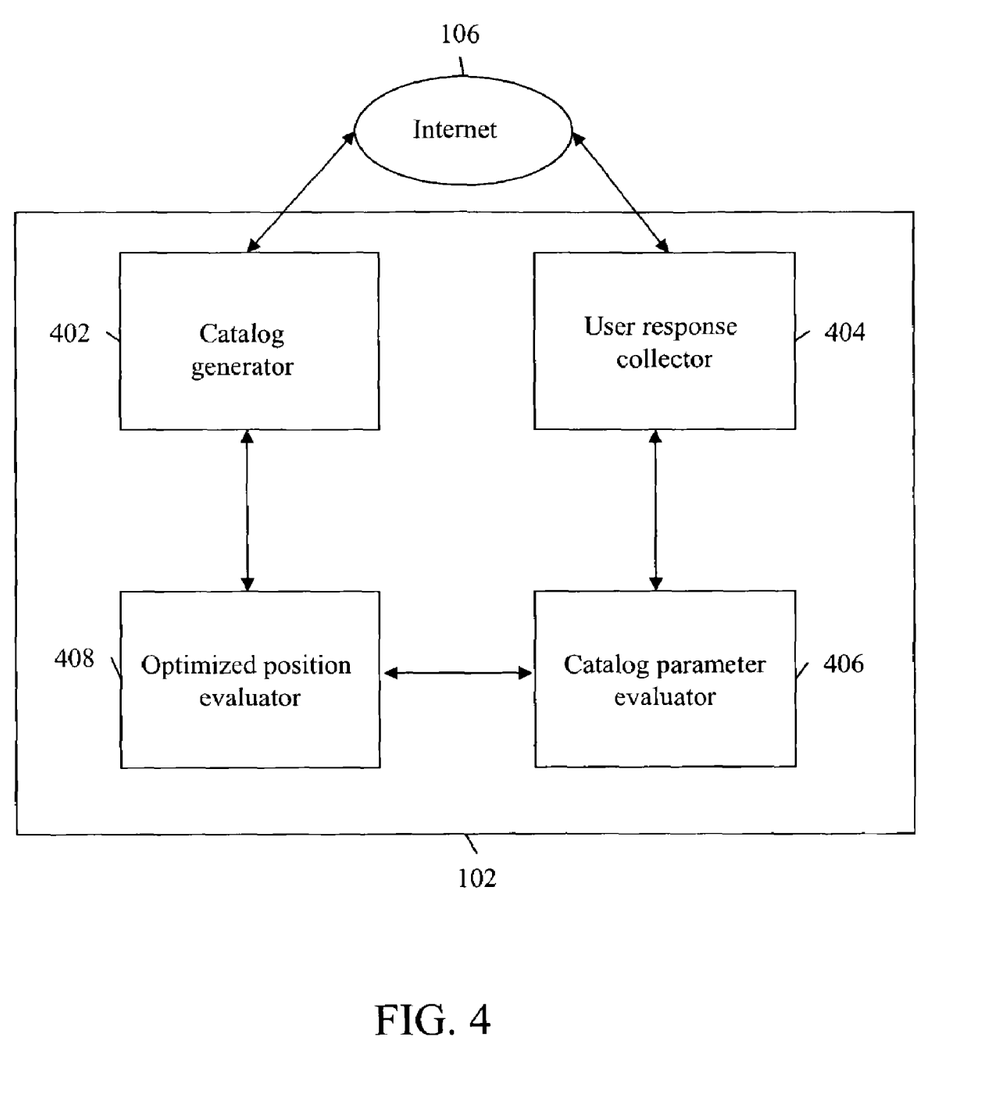
FIG. 4 is a block diagram illustrating a system suitable for designing an optimized catalog in accordance with a preferred embodiment of the present invention.

FIG. 4 is a block diagram illustrating a system suitable for designing an optimized catalog in accordance with a preferred embodiment of the present invention. Catalog design system 102 comprises a catalog generator 402, a user response collector 404, a catalog parameter generator 406 and an optimized position evaluator 408.

Catalog generator 402 generates a catalog. The merchant can specify the list of items that should constitute the catalog. Thereafter, catalog generator 402 can form a set of initial catalogs for the provided list of items. The initial catalogs can have random placement of items. The set of initial catalogs can also be formed taking into account the preferences of the merchant. For example, the merchant can provide a set of initial positions for certain items. Further, data mining techniques can be used on previous purchase patterns to generate a catalog.

Catalog generator 402 deploys the set of initial catalogs over the world wide web (WWW), or the Internet 106, so that they are accessible to the potential customers of the merchant. User response collector 404 obtains the customer response to these deployed catalogs. The user response can be recorded in the form of tables that maps the position and nature of an item to the corresponding user responses.

Catalog parameter generator 406 uses information collected by user response collector 404 to compute the catalog parameters. The exact manner of computing these catalog parameters will be explained in detail later.

Optimized position evaluator 408 models the objective of the merchant in terms of the catalog parameters and the placement of items. Thereafter, this optimized function is evaluated to obtain the optimal position of each item in the catalog. The exact manner in which this modeling is done and subsequently evaluated will be explained in detail later. The optimized positions obtained from optimized position evaluator 408 are used to form an optimized catalog. Catalog generator 402 can form this catalog.

Modeling of the Catalog Parameters and the Optimization Function

Optimization of item placements ensures improvements in user responses for each item placed in the catalog. The optimization can be done in order to maximize the revenues or profits for the merchant. These revenues and profits are objective measures as they aid quantification of user responses in terms of the objective behind optimization. User responses such as buying and selling transactions on the deployed catalog can therefore be quantified through these objective measures. Quantification of user response in terms of an objective measure has been explained through expressions described below.

Constraints to Modeled Objective Measure of Catalog

Let C be a catalog for items x1, x2, x3 and so on, placed in the positions p1, p2, p3 and so on, respectively. An item x located at position p can be represented as follows.

$$C(x,p)=1 \quad (1)$$

A constraint to catalog generation for items is that an item cannot be placed at more than one position in the catalog. The following two conditions quantify this constraint:

$$C(xi,pi)=1 \text{ or } C(xi,pj)=0 \text{ and} \quad (2)$$

$$C(xi,pi)=1 \text{ or } C(xj,pi)=0 \quad (3)$$

In the equations stated above, 'i' and 'j' can have values from 1 to n, where 'n' is the total number of items available in the catalog. C(xi, pi) indicates a product xi placed at position pi in catalog C. Equation 2 implies that if product xi is positioned at pi in catalog C (i.e. C(xi,pi)=1) then the same product xi in the same catalog C cannot be placed at another position pj (i.e. C(xi,pj)=0). Also, as stated in equation 3, if a product xi is positioned at pi in catalog C (i.e. C(xi,pi)=1) then another product xj cannot be placed at the same position pi. The use of these constraints would prevent repetition and deletion of items while determining the optimized catalog. Using methods such as linear programming, quadratic programming and stochastic optimization of the end objective can be done. In the case of linear or quadratic programming, the function is optimized subject to the abovementioned constraints. In the case of stochastic optimization, the optimization function embeds the constraints.

Catalog Parameters Used to Determine Objective Measure

Let the objective measure for an item xi placed at position pi be r(xi, pi). r(xi, pi) can be revenues due to the item xi. r(xi, pi) can also be any other objective measure as defined by the merchant, such as number of clicks. This objective measure can be expressed as follows.

$$r(xi, pi)=r_{xi}f_1(pi; \Theta i)+\Sigma_{xj,j\neq 1}r_{xi\ xj}f_2(pi, pj; \Theta_{ij})+\Sigma_{xj, xk, j, k\neq 1}r_{xi\ xj\ xk}f_3(pi, pj, pk; \Theta_{ijk})+\ldots \quad (4)$$

where, $r_{xi}$ captures the effect of the nature of the item xi on the objective measure, i.e., $r_{xi}$ is the product differential for item xi.

$r_{xi\ xj}$, $r_{xi\ xj\ xk}$, ... capture the effects of nature of other items in the catalog on objective measure of concerned product xi (pair wise and higher order effects), i.e., $r_{xi\ xj}$, $r_{xi\ xj\ xk}$, ... are cross product differentials for item xi.

$f_1(pi; \Theta_i)$ captures the effect of position pi of the item xi in the catalog on the objective measure, i.e., $f_1(pi; \Theta_1)$ is the search cost for the item xi starting from the top location of the catalog. (Though function $f_1$ has been represented as a parametric function in the above expression, it is not necessary that it should be a parametric function)

$\Theta_i$ is a set of parameters controlling the nature of the function $f_1(pi; \Theta_i)$ for the product xi. If the parameters are changed, then the function will change. For example, if $f_1(p)=1/(a+bp^2)$, then $\Theta=[a,b]$ is the set of parameters. Changing a and b, would change the function $f_1$.

$f_2(pi, pj; \Theta_{ij})$, $f_3(pi, pj, pk; \Theta_{ijk})$, ... capture the second order and higher order effects of positions of other items on the item xi, i.e., $f_2(pi, pj; \Theta_{ij})$, $f_3(pi, pj, pk; \Theta_{ijk})$, ... capture the search cost across various products. (Though function $f_2$, $f_3$, ... are represented as parametric functions in the above expression, it is not necessary that they should be parametric functions. They can also have non-parametric forms)

$\Theta_{ij}$, $\Theta_{ijk}$, ... are parameters controlling the functions $f_2(pi, pj; \Theta_{ij})$, $f_3(pi, pj, pk; \Theta_{ijk})$, ... for relative positions of items xi and xj and relative positions of the items xi, xj, xk.

The estimated catalog parameters are used for modeling an optimizing function. The model involves depiction of an objective measure, such as revenues or profits, in terms of catalog parameters and the placement of the items in the catalog. The manner in which this is done is explained below.

Modeled Objective Measure

Catalog C can be represented by a matrix [v], where element $v_{xp}$ corresponds to the catalog entry C (x,p). If a product x, in catalog C, is placed in position p, then $v_{xp}=1$ else $v_{xp}=0$.

The total objective measure, R, can be modeled in the manner shown below.

$$R=\Sigma_{xi,\ pi}r_{xi}v_{xi\ p}f_1(pi;\ \Theta_i)+\Sigma_{xi,\ xj,\ pi,\ pj}r_{xi\ xj}v_{xi}v_{xj}f_2(pi, pj;\ \Theta_{ij})+\Sigma_{xi, xj, xk, pi, pj, pk}r_{xi\ xj\ xk}v_{xi}v_{xj}v_{xk}f_3(pi, pj, pk;\ \Theta_{ijk})+\ldots \quad (5)$$

The optimal catalog can be obtained by maximizing the expression R with respect to [v]. Maximization of R implies maximization of objective measures like revenues or profits.

Modeling of Constraints to Modeled Function

For the purpose of optimization, the constraints of the catalog are represented as the constraints on the matrix variables [v]:

$v_{xp} \geq 0$ for all x and p, implies that for every item x, placed in position x of the catalog, the value in the matrix is not less than 0;

$v_{xp}=1 \Leftrightarrow v_{xq}=0$ for all $q \neq p$ and $v_{yp}=0$ for all $y \neq x$, implies that if a product x is placed in position p then the matrix value there would be 1. The matrix values corresponding to the placement of the same item x at any other position q would be 0. Also, at the same position p the value in the matrix would be 0 for any other product y.

The above two constraints can also be represented as follows:

$$\Sigma_p v_{xp}=1 \text{ for all } x \quad (6)$$

The above expression implies that the sum of values in the matrix with product x placed at different positions can only be 1. The value can only be 1 because one product x can occupy only one place p in the catalog.

$$\Sigma_x v_{xp}=1 \text{ for all } p \quad (7)$$

The above expression implies that the sum of values corresponding to different products placed at the same position p can only be 1. This is because one position p can be occupied by only one product x.

Example of Optimal Catalog Determination

To serve as an example for estimating a function, we consider the modelled function denoted by equation 5. The function has been approximated to the second term only. Parameter $\Theta_i$ is considered to be independent of i. Also, $\Theta_{ij}$ is taken independent of i and j.

Catalog Parameter Estimation

Functions $f_1$ and $f_2$ are assumed to be heavy tailed functions like the Cauchy distribution function. A heavy-tailed function for $f_1$ and $f_2$ is considered from the practical consideration of customer behaviour. Any other decreasing function could also be taken as an example. The reason for choosing a heavy-tailed function is that a user browses the top few items of a catalog, and then his interests decrease rapidly as he goes down further. So the interest in the top items is usually more than that in the bottom ones. However, if a user is patient enough to browse through several pages then it can be assumed that he would be patient enough to browse a few pages more. In other words, if all users' responses on the products of a catalog are aggregated, the difference between the responses to the bottom items is not very high. For example, the difference between the responses to an item placed at the 15$^{th}$ page and that placed at the 18$^{th}$ page is insignificant, but they certainly have some effect since there can be some users who will browse the catalog way down. A heavy-tail function captures this effect; it is sharply peaked and decreases rapidly but maintains an almost constant non-zero value towards the tail.

Therefore, $$f_1(p)=1/\{1+((p-1)/k_1)^2\} \text{ and} \quad (8)$$

$$f_2(p,q)=1/[\{1+((p-1)/k_1)^2\}\{1+((q-p)/k_2)^2\}] \quad (9)$$

In the above equations equation 8 is a standard form of Cauchy distribution. Equation 9 on the other hand, is a product of two Cauchy distribution functions considering both the absolute position of an item and relative positions of two items.

Also, $$\Theta_i=\{k_1\} \text{ for all i, and} \quad (10)$$

$$\Theta_{ij}=\{k_1, k_2\} \text{ for all i and j.} \quad (11)$$

For the purpose of solving the modeled equation, the first step should be estimation of catalog parameters such as $r_{xi}$, $r_{xi\ xj}$, $k_1$ and $k_2$. For the purpose of estimating these catalog parameters method of maximizing likelihood estimate has been employed. The likelihood measure, say E, is given as, $$E=\Sigma_n\Sigma_{xi}[\{r_{xio}^{(n)}-r_{xi}/(1+(p_i^{(n)}-1/k_1)^2)\}-\Sigma_{j\neq 1}\{r_{xi\ xj}/(1+(p_i^{(n)}-1/k_1)^2)(1+(p_i^{(n)}-p_j^{(n)}/k_2)^2)\}]^2 \quad (12)$$

$r_{xio}^{(n)}$ is the user response to the product xi on the basis of nth catalog.
$pi^{(n)}$ and p is the position of product corresponding to position xi.

The parameters are estimated by successively performing the following operations for N different catalogs deployed for user access.

$$r_{xi} \leftarrow r_{xi}+\eta \partial E/\partial r_{xi}; \quad (13)$$

$$r_{xi\ xj} \leftarrow r_{xi\ xj}+\eta \partial E/\partial r_{xi\ xj}; \quad (14)$$

$$k_1 \leftarrow k_1+\eta \partial E/\partial k_1; \text{ and} \quad (15)$$

$$k_2 \leftarrow k_2+\eta \partial E/\partial k_2. \quad (16)$$

where $\eta$ is a constant.

Modeling of Objective Measure:

Once the catalog parameters have been estimated, we consider the following modeled function for optimization of product placements:

$$J=\Sigma_{xi\ pi}r_{xi}v_{xi\ pi}f_1(pi)+\Sigma_{xi\ xj\ pi\ pj}v_{xi\ pi}v_{xj\ pj}r_{xi\ xj}f_2(pi,pj)-\lambda_1(\delta_{xi\ xj}(1-\delta_{pi\ pj})+\delta_{xi\ xj}(1-\delta_{pi\ pj})))-\lambda_2(\Sigma_{xi}(\Sigma_{pi}v_{xi\ pi}-1)^2+\Sigma_{xi}(\Sigma_{pi}v_{xi\ pi}-1)^2) \quad (17)$$

where, $\lambda_1$ and $\lambda_2$ are lagrangian multipliers.
$\delta_{xy}$ is Kronecker delta function such that, $\delta_{xy}=1$ if x=y, and zero otherwise. It is used to incorporate the catalog constraints, equation 6 and 7, into the stochastic optimisation function.

Optimization, coupled with constraints, provides the optimal locations of all items placed in the catalog. Continuing with the example, equation 16 is optimized using one of the various methods mentioned to obtain optimized values for $v_{xi\ pi}$.

Figure 5:
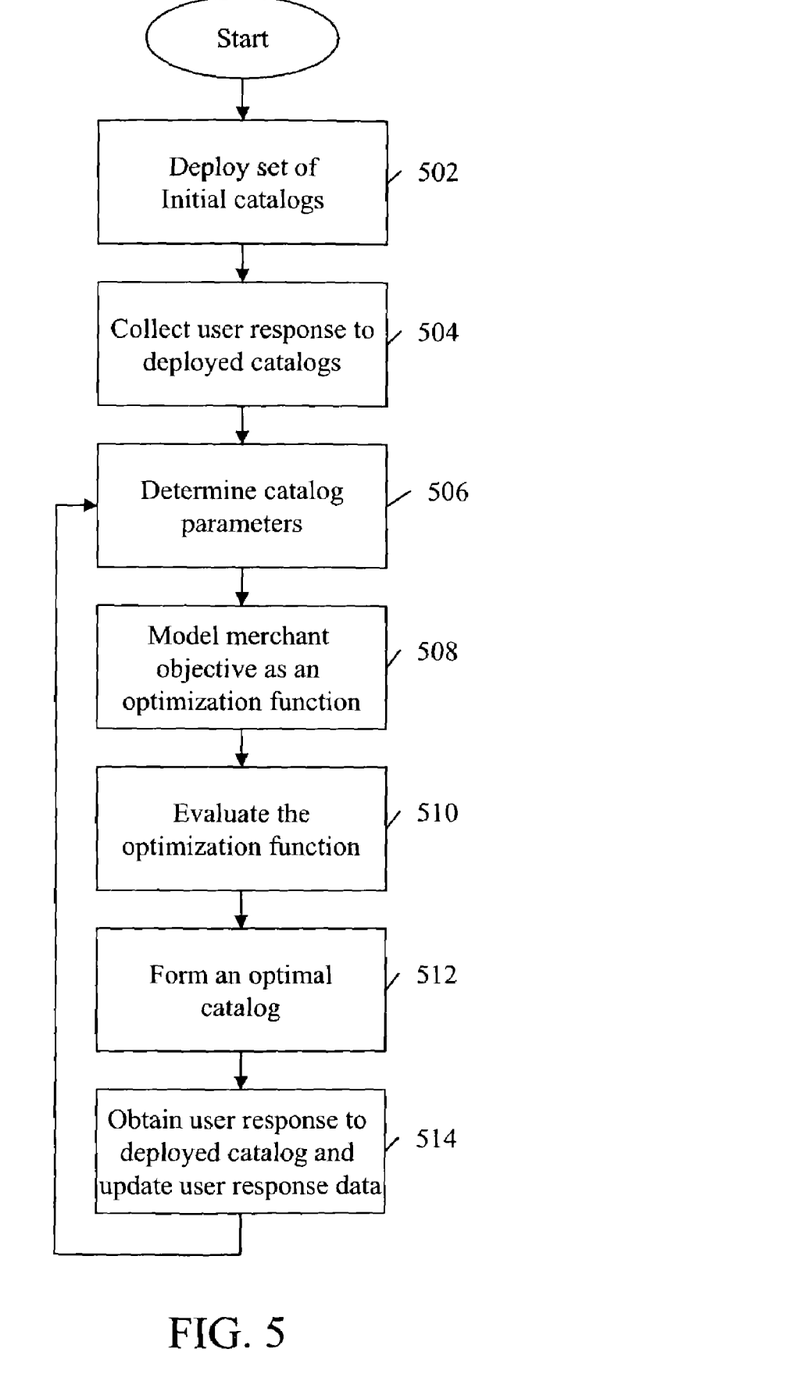
FIG. 5 is a flowchart illustrating the method of dynamically optimizing the placement of items in a catalog in accordance with an alternative embodiment of the present invention.

In an alternative embodiment of the present invention, the placement of products in the catalog can be dynamically changed based on user responses. FIG. 5 is a flowchart illustrating the method of dynamically optimizing the placement of items in a catalog. The optimization of products is done in order to maximize a specified objective. Several initial catalogs, each with different placement of items, are deployed at step 502. User responses to these catalogs are collected at step 504. The user response is computed in terms of catalog parameters at step 506. At step 508, the merchant objective is modeled as an optimization function in terms of item placement and the catalog parameters. This optimization function is evaluated to identify the optimal placement of items in the catalog at step 510. At step 512, a catalog is formed with the identified optimal positions. This is deployed and subsequently user response is collected for this deployed catalog at step 514, which updates the user response data. Subsequently, steps 506 to 514 are repeated and in this manner the placement of items in the catalog are dynamically updated to deploy the optimal catalog based on recent user response.

Hardware and Software Implementation

The system, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

Figure 6:
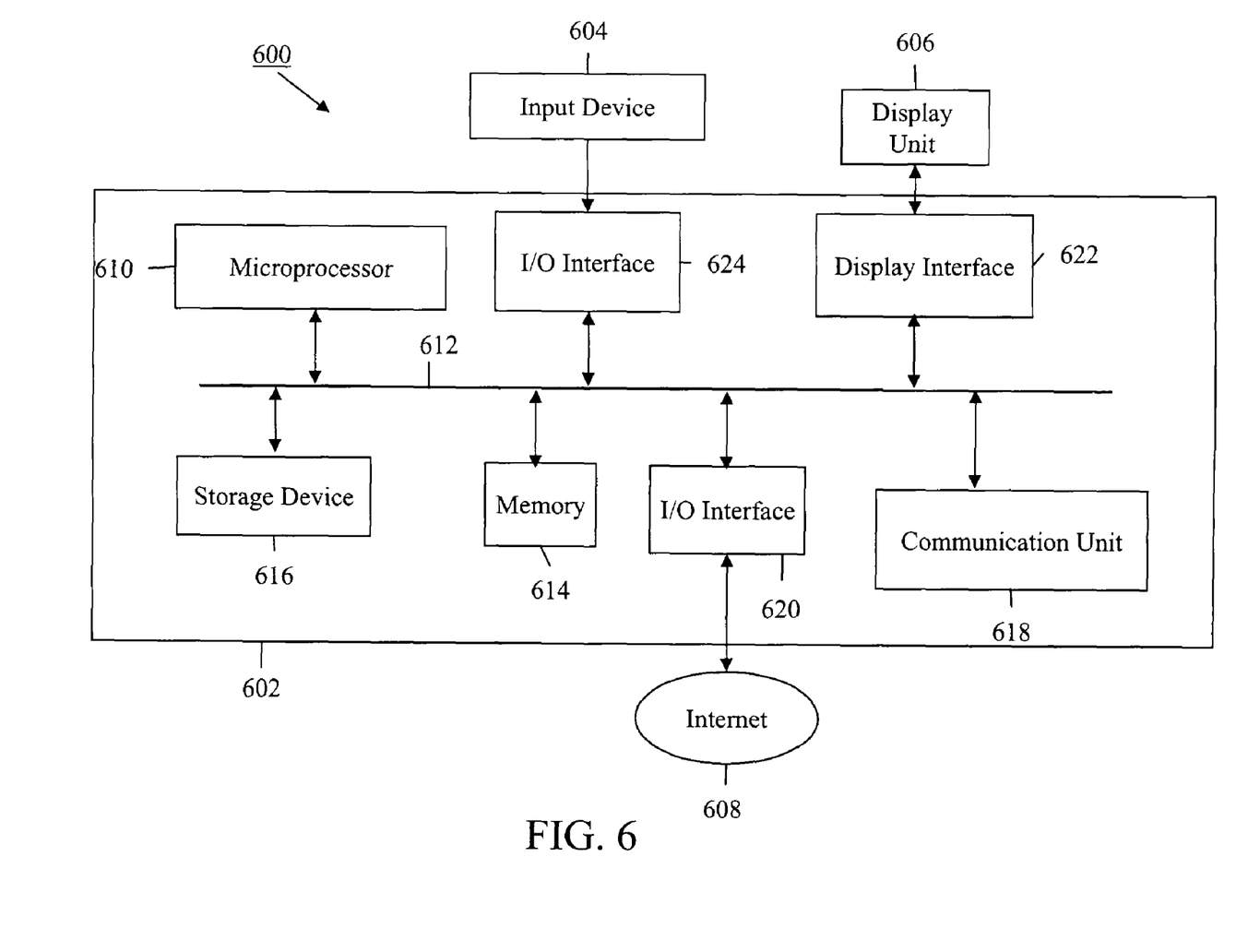
FIG. 6 shows a computer system that can be used to implement the current invention.

One such computer system has been illustrated in FIG. 6. The computer system 600 comprises a computer 602, an input device 604, a display unit 606 and the Internet 608. Computer 602 comprises a microprocessor 610. Microprocessor 610 is connected to a communication bus 612. Computer 602 also includes a memory 614. Memory 614 may include Random Access Memory (RAM) and Read Only Memory (ROM). Computer 602 further comprises storage device 616. It can be a hard disk drive or a removable storage drive such as a floppy disk drive, optical disk drive and the like. Storage device 616 can also be other similar means for loading computer programs or other instructions into the computer system. The computer system also includes a communication unit 618. Communication unit 618 allows the computer to connect to other databases and Internet 608 through an I/O interface 620. Communication unit 618 allows the transfer as well as reception of data from other databases. Communication unit 618 may include a modem, an Ethernet card or any similar device, which enables the computer system to connect to databases and networks such as LAN, MAN, WAN and the Internet. The computer system also includes a display interface 622 for connecting to display unit 606. The computer system facilitates inputs from a user through input device 604, accessible to the system through I/O interface 624.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

A person skilled in the art can appreciate that the various processing machines and/or storage elements may not be physically located in the same geographical location. The processing machines and/or storage elements may be located in geographically distinct locations and connected to each other to enable communication. Various communication technologies may be used to enable communication between the processing machines and/or storage elements. Such technologies include session of the processing machines and/or storage elements, in the form of a network. The network can be an intranet, an extranet, the Internet or any client server models that enable communication. Such communication technologies may use various protocols such as TCP/IP, UDP, ATM or OSI.

The heretofore-described invention has numerous advantages. The invention enables automatic generation coupled with dynamic modification of catalogs. Dynamic modification of catalogs allows incorporation of latest user responses in determination of optimized catalogs. Furthermore, the user responses towards experimental catalogs are obtained in an implicit manner. Implicit user responses can be obtained without much trouble to the user. As users do not need to provide manual ratings to items placed in the catalog, the system for catalog generation is user friendly too.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for automatically designing a catalog for a plurality of items using a computer system, the method comprising the steps of:
    estimating a relationship between placement of an item in a catalog and corresponding user responses, the user responses being obtained from a transaction history;
    determining an optimized position for each item using the estimated relationships;
    forming a catalog with the items being placed at determined optimized positions;
    deploying a plurality of initial catalogs with different item placements; and
    obtaining user responses for the initial catalogs, wherein the plurality of initial catalogs refer to any of different catalogs for different groups of users over a same period of time, different catalogs for a same group of users over different periods of time, and a combination of both, where said different and same group of users can view only one said different catalogs over a particular period of time,
    wherein the step of estimating a relationship between placement of the items in a catalog and corresponding user responses comprises a computer that performs the steps of:
        computing item differentials from the user responses; and
        computing search costs from the user responses,
    wherein the step of computing item differentials comprises the steps of:
        computing an effect of the nature of an item on said user responses; and
        computing an effect of the nature of an item on said user responses for other items in the catalog,
    wherein the step of computing search costs comprises the steps of:
        computing an effect of placing an item at a particular position in the catalog on said user responses; and
        computing an effect of relative positions of items on said user responses,
    wherein the step of determining an optimized position comprises the steps of:
        modeling a merchant specified objective as an optimization function in terms of item placement; and
        evaluating the optimization function to identify an optimal placement of each item in the catalog.

2. A method for automatically designing a catalog for a plurality of items using a computer system, the method comprising the steps of:
    estimating a relationship between placement of an item in a catalog and corresponding user responses, the user responses being obtained from a transaction history;
    determining an optimized position for each item using the estimated relationships;
    forming a catalog with the items being placed at determined optimized positions;
    deploying a plurality of initial catalogs with different item placements; and
    obtaining user responses for the initial catalogs, wherein the plurality of initial catalogs refer to any of different catalogs for different groups of users over a same period of time, different catalogs for a same group of users over different periods of time, and a combination of both,
    wherein the step of estimating a relationship between placement of the items in a catalog and corresponding user responses comprises a computer that performs the steps of:
        computing item differentials from the user responses; and
        computing search costs from the user responses,
    wherein the step of computing item differentials comprises the steps of:
        computing an effect of the nature of an item on said user responses; and
        computing an effect of the nature of an item on said user responses for other items in the catalog,
    wherein the step of computing search costs comprises the steps of:
        computing an effect of placing an item at a particular position in the catalog on said user responses; and
        computing an effect of relative positions of items on said user responses,
    wherein the step of determining an optimized position comprises the steps of:
        modeling a merchant specified objective as an optimization function in terms of item differentials, wherein said item differentials quantify user responses based on a nature of an item; and evaluating the optimization function to identify an optimal placement of each item in the catalog.

3. A method for automatically designing a catalog for a plurality of items using a computer system, the method comprising the steps of:

estimating a relationship between placement of an item in a catalog and corresponding user responses, the user responses being obtained from a transaction history;

determining an optimized position for each item using the estimated relationships;

forming a catalog with the items being placed at determined optimized positions;

deploying a plurality of initial catalogs with different item placements; and obtaining user responses for the initial catalogs, wherein the plurality of initial catalogs refer to any of different catalogs for different groups of users over a same period of time, different catalogs for a same group of users over different periods of time, and a combination of both, wherein the step of estimating a relationship between placement of the items in a catalog and corresponding user responses comprises a computer that performs the steps of:

computing item differentials from the user responses; and computing search costs from the user responses, wherein the step of computing item differentials comprises the steps of:

computing an effect of the nature of an item on said user responses; and computing an effect of the nature of an item on said user responses for other items in the catalog, wherein the step of computing search costs comprises the steps of:

computing an effect of placing an item at a particular position in the catalog on said user responses; and computing an effect of relative positions of items on said user responses, wherein the step of determining an optimized position comprises the steps of:

modeling a merchant specified objective as an optimization function in terms of search costs, wherein said search costs quantify an effect of placement of items on user responses; and evaluating the optimization function to identify an optimal placement of each item in the catalog.

* * * * *